United States Patent
Grimm et al.

(10) Patent No.: US 11,976,679 B2
(45) Date of Patent: May 7, 2024

(54) PROCESS FOR MAKING A CONNECTING ELEMENT FOR THE FRICTION-INCREASING CONNECTION OF COMPONENTS, AND USE OF A CONNECTING ELEMENT

(71) Applicant: 3M INNOVATIVE PROPERTIES COMPANY, St. Paul, MN (US)

(72) Inventors: Florian T. Grimm, Kempten (DE); Werner Kaufenstein, Kempten (DE); Volker Peterhansl, Langenargen (DE); Roman Rudolph, Kempten (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/257,120

(22) PCT Filed: Dec. 20, 2021

(86) PCT No.: PCT/IB2021/062053
§ 371 (c)(1),
(2) Date: Jun. 13, 2023

(87) PCT Pub. No.: WO2022/137094
PCT Pub. Date: Jun. 30, 2022

(65) Prior Publication Data
US 2024/0035499 A1 Feb. 1, 2024

(30) Foreign Application Priority Data
Dec. 21, 2020 (EP) .................................. 20215986.9

(51) Int. Cl.
F16B 2/00 (2006.01)

(52) U.S. Cl.
CPC ......... *F16B 2/005* (2013.01); *Y10T 29/49792* (2015.01)

(58) Field of Classification Search
CPC ........................... F16B 2/005; Y10T 29/49792
See application file for complete search history.

(56) References Cited

U.S. PATENT DOCUMENTS 3,692,341 A * 9/1972 Brown ...................... F16B 5/02
403/408.1
6,347,905 B1 2/2002 Lukschandel
(Continued)

FOREIGN PATENT DOCUMENTS

EP 2848824 A1 3/2015
GB 1119747 A 7/1968
(Continued)

OTHER PUBLICATIONS

1507 Extended EP Search Report for EP20215986.9, dated May 25, 2021, 3pgs.
(Continued)

*Primary Examiner* — Robert Sandy
(74) *Attorney, Agent, or Firm* — Thomas M. Spielbauer

(57) ABSTRACT

Arrays having a support structure and a plurality of connecting elements are described. Each connecting element is associated with at least one holding arm integrally linking the connecting element to at least one of (a) the support structure and (b) one or more of the other connecting elements. The connecting element of these arrays include a metal substrate having joining surfaces on opposite sides, where each joining surface has hard particles fixed on the metal substrate by a binder layer. Processes for producing such arrays and using the connecting elements are also described.

14 Claims, 3 Drawing Sheets

(56) References Cited

U.S. PATENT DOCUMENTS

2003/0087097 A1* 5/2003 Lukschandel ......... C23C 28/021
                                                       428/323
2017/0343031 A1* 11/2017 Bui ........................ C23C 4/134

FOREIGN PATENT DOCUMENTS

WO    2007131744 A2    11/2007
WO    2015082365 A1     6/2015

OTHER PUBLICATIONS

International Search Report for PCT International Application No. PCT/IB2021/062053, dated Mar. 23, 2022, 5 pages.

* cited by examiner

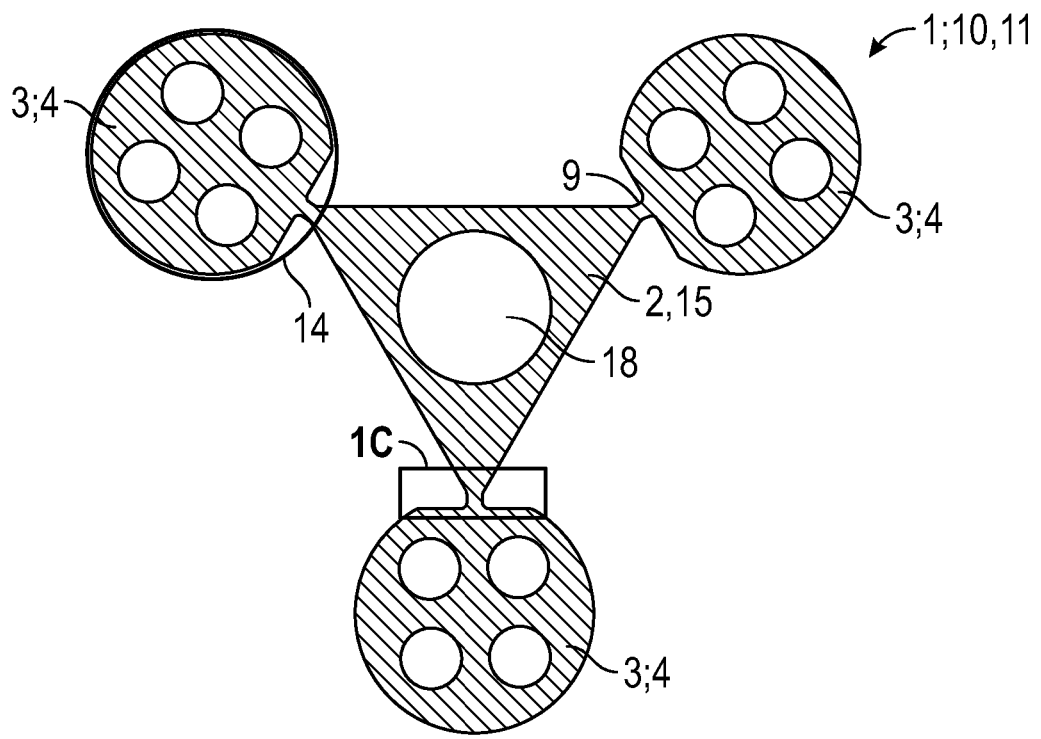
FIG. 1A
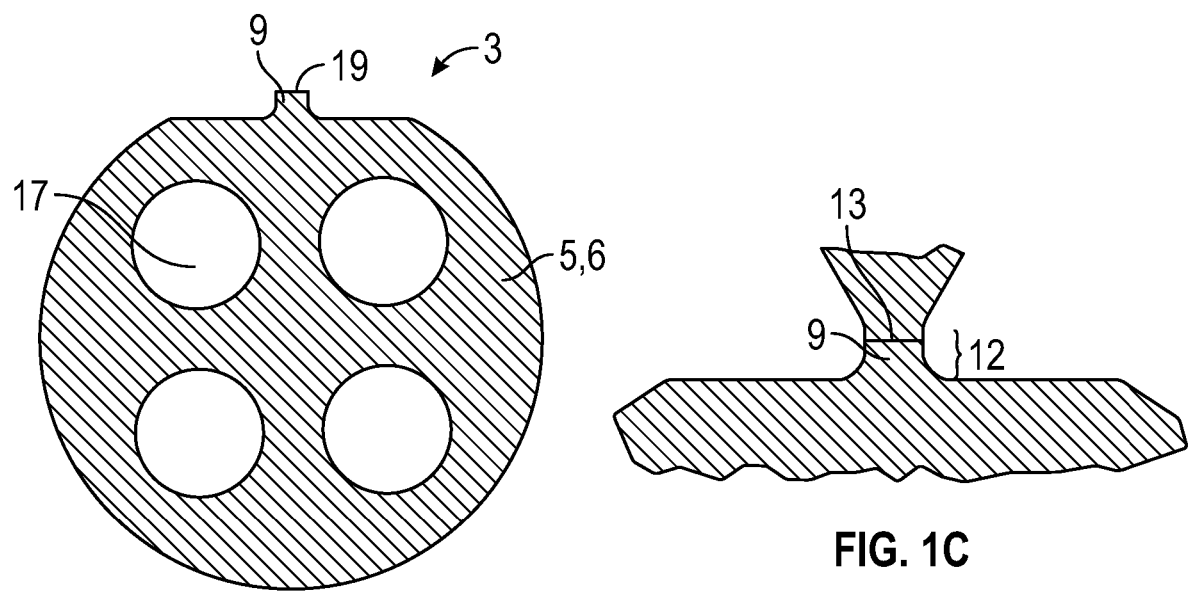
FIG. 1B
FIG. 1C

PROCESS FOR MAKING A CONNECTING ELEMENT FOR THE FRICTION-INCREASING CONNECTION OF COMPONENTS, AND USE OF A CONNECTING ELEMENT

CROSS REFERENCE TO RELATED APPLICATIONS

This application is a national stage filing under 35 U.S.C. 371 of PCT/IB2021/062053, filed 20 Dec. 2021, which claims the benefit of EP Application No. 20215986.9, filed 21 Dec. 2020, the disclosure of which is incorporated by reference in its/their entirety herein.

TECHNICAL FIELD

The present disclosure relates to a process for making a connecting element for the friction-increasing connection of components to be joined.

BACKGROUND

Force-locked connections are frequently used in all areas of machine, plant and motor vehicle construction and energy generation for the transmission of forces or torques. The size of the force which can be respectively transmitted depends not only on the structural design but also primarily on the static friction value (coefficient of static friction) of the component surfaces connected to one another. Therefore, in the case of such force-locked connections, it is endeavored to provide friction-increasing measures that allow the greatest possible transverse forces and torques to be transmitted safely. Further, force-locked connections may also be referred to as non-positive connections or frictional connections.

It is known to use friction-increasing interlayers to increase the holding forces or increase the torques than can be transmitted in bolted and clamped connections. U.S. Pat. No. 6,347,905 B1 discloses a connecting element for the friction-increasing play-free reversible connection of components to be joined. The connecting element comprises a spring-elastic steel foil which bears on its surface particles of a defined size, which are fixed on the spring-elastic foil by means of a binder phase. The particles consist of a hard material, preferably of diamond, cubic boron nitride, aluminum oxide, silicon carbide or boron carbide. By using this separate connecting element, the coefficient of static friction can be increased in frictional connections.

Such connecting elements, used for friction-increasing connection of two components to be joined, are generally produced by an electroless plating process. A metal substrate, e.g. a steel foil, is coated with hard particles and a metallic binder in an electroless coating bath. For this coating process, the metal substrates are placed on suitable carriers or racks to ensure a defined distance between different metal substrates and a uniform coating of the metal substrate.

With the trend towards smaller and more compact products and the need for very small connecting elements having a diameter of only several millimeters, e.g. for automotive electrification or applications in the electronic industry that require friction enhancement, on the one hand racking becomes very difficult or almost impossible, while on the other hand production cost is very high as only a relatively small number of metal substrates can be produced with one batch of coating bath. This is due to the volume needed for the racks which is relatively large compared to the size of the very small connecting elements, resulting in an inefficient use of the coating bath volume.

There is a need to improve the process for making connecting elements for the friction-increasing connection of components, to allow production of connecting elements having a small size with diameters of only up to about 10 mm.

As used herein, the term "comprise" shall include also the terms "consist essentially of" and "consists of".

SUMMARY

In a first aspect, the present disclosure relates to an array of connecting elements, the array comprising
 (i) a support structure, and
 (ii) a plurality of connecting elements, wherein each connecting element comprises a metal substrate having a first joining surface on one side of the substrate and a second joining surface on an opposite side of the substrate, wherein each joining surface comprises hard particles fixed on the metal substrate by a binder layer;
 wherein each connecting element is associated with at least one holding arm integrally linking the connecting element to at least one of
 (a) the support structure and
 (b) one or more other connecting elements.

In another aspect, the present disclosure also relates to a process for producing such an array of connecting elements, the process comprising
 (a) forming an array from a piece of metal, wherein the array comprises
 (i) a support structure, and
 (ii) a plurality of metal substrates, each individual metal substrate being a metal substrate for a connecting element,
 wherein each metal substrate is associated with at least one holding arm integrally linking the metal substrate to at least one of
 (A) the support structure and
 (B) one or more other metal substrates;
 and wherein the array has a first surface on one side of the array and a second surface on an opposite side of the array, and
 (b) fixing hard particles on the first and second surfaces of the array with a binder layer, to form the array of connecting elements.

The process disclosed herein may further comprise
 (c) separating each connecting element from the support structure or from one or more other connecting elements, to form a plurality of individual connecting elements.

In yet a further aspect, the present disclosure also relates to the use of a connecting element made from an array as disclosed herein to connect a first component and a second component to be joined in machine, plant or motor vehicle construction, in energy generation, or in microelectronic or micromechanic equipment.

With the process disclosed herein, very small connecting elements having a diameter of only several millimeters, e.g. diameters of only up to 10 mm or up to 5 mm or even smaller, can be produced. The connecting elements produced by the process disclosed herein can be used for friction-increasing connection of two components to be joined, e.g. for automotive electrification or applications in the electronic industry. The array disclosed herein can be placed on suitable carriers or racks to ensure a defined distance between different arrays and a uniform coating of the array, whereas racking for the very small connecting elements would not have been economically feasible for high volume applications. With the process disclosed herein, also connecting elements having a diameter larger than 10 mm can be produced, for example connecting elements having a diameter of up to 20 mm, or up to 30 mm, or more.

By using a connecting element produced by the process disclosed herein, the coefficient of static friction of frictional connections is increased.

BRIEF DESCRIPTION OF THE DRAWINGS

The present disclosure is explained in more detail on the basis of the drawings, in which FIGS. 1A-1C schematically show an array of the present disclosure and a connecting element made from the array, FIGS. 2A-2D schematically show an array of the present disclosure and a connecting element made from the array, and FIG. 3 schematically shows a cross-sectional view of a connecting element made from an array of the present disclosure.

DETAILED DESCRIPTION

Figure 2A:
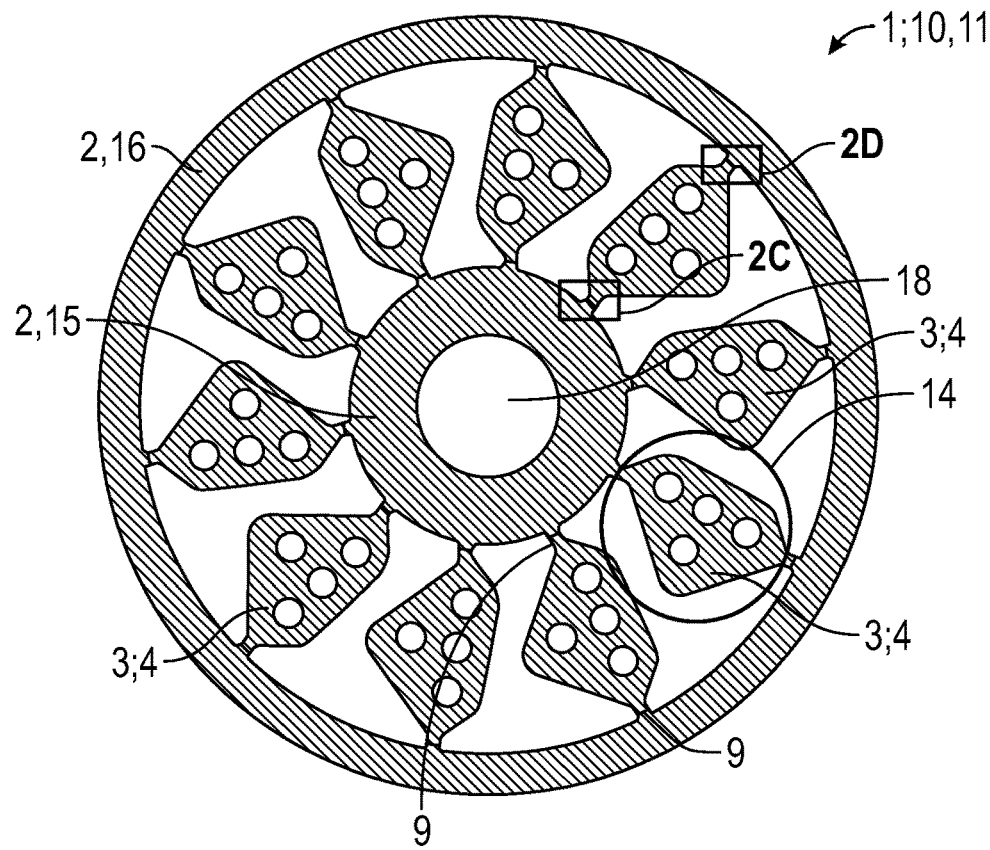

An individual connecting element of the array of the present disclosure comprises a metal substrate having a first joining surface on one side of the substrate and a second joining surface on an opposite side of the substrate. Each joining surface comprises hard particles fixed on the metal substrate by a binder layer.

The hard particles preferably consist of a material which, under the particular conditions of use, does not react chemically either with the materials of the components to be joined or with environmental media. It is preferably an inorganic material.

Preferably, the hard particles are selected from the group consisting of silicon carbide, aluminum oxide, boron carbide, cubic boron nitride, and diamond. More preferably, diamonds are used as hard particles.

The size of the hard particles is selected in such a way that the damage to the joining surfaces caused by the particles being pressed into the surface does not reach an impermissible level. Preferably, this is ensured if the particle diameter is not greater than about three times the peak-to-valley height of the joining surfaces, which peak to valley results from machining of the joining surfaces. A mean particle size of 100 µm ($d_{50}$) or less generally fulfils this requirement. For example, hard particles with a mean particle size ($d_{50}$) of 10 µm, 25 µm, 35 µm, 55 µm or 75 µm can be used. In some embodiments, hard particles with a mean particle size ($d_{50}$) from 10 to 75 µm are used, or from 25 to 55 µm. The mean particle size can be measured by laser diffraction (Cilas, wet measurement).

The hard particles should have a narrow grain size range in which the scatter about a given nominal diameter amounts to no more than about +/−50%. In some embodiments, the scatter about a given nominal diameter should not amount to more than about +/−25%.

The number of hard particles per unit surface area of the joining surfaces of the connecting element may be selected in such a way that the normal force which is available for joining the components together is sufficient to ensure that the particles are pressed into the surface of the components to be joined. This will generally be the case if the area percentage of the joining surfaces of the connecting element which is covered with hard particles is from 3% to 80%. The area percentage of the joining surfaces of the connecting element which is covered with hard particles can be selected dependent on the mean particle size ($d_{50}$) of the hard particles. For example, for a mean particle size ($d_{50}$) of the hard particles of 10 µm from about 8% to 20% of the joining surfaces of the connecting element may be covered with hard particles, for a mean particle size ($d_{50}$) of 25 µm the area percentage may be from about 8% to 25%, for a mean particle size ($d_{50}$) of 35 µm, the area percentage may be from about 10% to 30%, for a mean particle size ($d_{50}$) of 55 µm, the area percentage may be from about 20% to 60%.

The metal substrate may be made from steel, for example from unalloyed steel. Also high-alloy steel or stainless steel can be used. Examples for unalloyed steel are grade C75S-1.1248 according to DIN EN 10132-4 or grade C60S-1.1211 according to DIN EN 10132-4.

Typically, the thickness of the metal substrate is from 0.01 to 1 mm. The thickness of the metal substrate is selected depending on the application. In some embodiments, the thickness of the metal substrate is up to 1.0 mm. In other embodiments, the thickness is up to 0.5 mm. In some other embodiments, the thickness is up to 0.2 mm, in some other embodiments, the thickness is up to 0.1 mm.

The binder layer may be a metallic binder layer or a polymeric binder layer.

The polymeric material of the polymeric binder layer may be selected from the group consisting of epoxy materials, acrylic materials, polyester materials, polyurethane materials, formaldehyde resins, polyvinyl acetate (PVAC) materials, polyvinylchloride (PVC) materials, alkyd resins, silicone materials, rubber materials, fluoropolymers and combinations thereof.

Preferably, the binder layer is a metallic binder layer. The metallic binder layer may comprise nickel.

The thickness of the binder layer may be from 2 to 70 µm, or from 5 to 50 µm, or from 5 to 30 µm.

In some embodiments, the thickness of the binder layer is not more than 80% of the mean particle size ($d_{50}$) of the hard particles. In some other embodiments, the thickness of the binder layer is not more than 60% of the mean particle size ($d_{50}$) of the hard particles. In yet some other embodiments, the thickness of the binder layer is not more than 20% of the mean particle size ($d_{50}$) of the hard particles. The thickness of the binder layer may be at least 2 µm. The hard particles are protruding from the binder layer. When the connecting element is in frictional engagement with the components to be joined, the hard particles are pressed into the surfaces of the components to be joined, therefore increasing the coefficient of friction of the connection.

The array of connecting elements disclosed herein comprises (i) a support structure, and (ii) a plurality of connecting elements. In the array, each connecting element is associated with at least one holding arm integrally linking the connecting element to at least one of (a) the support structure and (b) one or more other connecting elements. In other words, the array is a structure of a plurality of connecting elements that are integrally linked by a holding arm either directly to each other or to a common support structure. In the array, there is a plurality of individual holding arms, and each connecting element is associated with at least one holding arm. By the holding arms, the individual connecting elements are linked to either the support structure or to one or more other connecting elements.

By "integrally linked" it is meant that the array is made of one single piece of metal, and that the support structure and the plurality of connecting elements are altogether made of one piece, where the connecting elements are integrally linked, i.e. integrally connected, to the support structure or to one or more other connecting elements by the holding arms.

At least one of the individual connecting elements is associated with at least one holding arm integrally linking the connecting element to the support structure. This will ensure the integrity of the array. Typically, more than one of the individual connecting elements are associated with at least one holding arm integrally linking the connecting element to the support structure.

For example, each connecting element may be associated with a holding arm integrally linking the connecting element to the support structure. The individual connecting elements may be further associated with one or two or more further holding arms integrally linking the connecting element to one or two or more other connecting elements. It is also possible that each individual connecting element is associated with only one holding arm integrally linking the connecting element only to the support structure.

It is also possible that some of the individual connecting elements are associated with a holding arm integrally linking the connecting element to the support structure and are further associated with one or more further holding arms integrally linking the connecting element to one or more other connecting elements, while some other of the individual connecting elements are associated with one holding arm integrally linking the connecting element only to the support structure, while some even other of the individual connecting elements are associated with one or more holding arms integrally linking the connecting element only to one or more other connecting elements.

In some embodiments, the support structure may comprise a connecting element or may consist of a connecting element. In some embodiments, the support structure may comprise or may consist of a plurality of connecting elements, each connecting element being associated with at least one holding arm integrally linking the connecting element to one or more other connecting elements of the support structure.

The array of connecting elements disclosed herein has a first surface on one side of the array and a second surface on an opposite side of the array. Each holding arm of the array has a cross section that is perpendicular to the first and the second surface of the array. A minimum cross-sectional area of each individual holding arm may be between 0.005 and 10 mm$^2$, or between 0.2 and 2 mm$^2$. With "minimum cross-sectional area" it is meant that the cross-sectional area of a cross section is measured along the length of the individual holding arm, and the minimum cross-sectional area is the cross-sectional area of the cross section having the smallest cross-sectional area along the length of the individual holding arm.

Typically, the holding arms have a minimum cross-sectional area in a middle position of the holding arm between the two connecting elements that are integrally linked by the holding arm. At a position near the connecting elements, the holding arms typically have a larger cross-sectional area than in a middle position, as they are typically formed with a smooth transition from the holding arm to the connecting element. This smooth transition is advantageous for the manufacturing of the array.

A minimum width of each individual holding arm measured on the first or the second surface of the array may be between 0.1 and 10 mm, or between 0.2 and 5 mm, or between 0.3 and 3 mm. With "minimum width" it is meant that the width of the individual holding arm measured on the first or the second surface of the array is measured along the length of the individual holding arm, and the minimum width is the smallest width along the length of the individual holding arm.

Typically, the holding arms have a minimum width in a middle position of the holding arm between the two connecting elements that are integrally linked by the holding arm. At a position near the connecting elements, the holding arms typically have a larger width than in a middle position, as they are typically formed with a smooth transition from the holding arm to the connecting element. This smooth transition is advantageous for the manufacturing of the array.

The width of each individual holding arm measured on the first or the second surface of the array may be selected depending on the dimensions of the connecting elements. An array may have individual holding arms with each of them having the same width, or with different holding arms having different width.

The length of each individual holding arm measured on the first or the second surface of the array may be selected depending on the dimensions of the connecting elements. An array may have individual holding arms with each of them having the same length, or with different holding arms having different lengths. The length of an individual holding arm should not be too large in order to not unnecessarily increase the size of the array.

Typically, the length of an individual holding arm is smaller than the diameter of the circumscribing circle of the individual connecting element with which the individual holding arm is associated. The length of an individual holding arm may be, for example, between 0.1 and 20 mm, or between 0.1 and 10 mm, or between 0.2 and 5 mm, or between 0.3 and 3 mm. In some embodiments, the length of some of the individual holding arms may be as large as or larger than the diameter of the circumscribing circle of the individual connecting element with which the individual holding arm is associated. The diameter of the circumscribing circle of the individual connecting element may be, for example, up to 10 mm, or up to 20 mm, or up to 30 mm, or larger.

Typically, the thickness of the array disclosed herein is from 0.04 to 1.2 mm.

The thickness of the array is selected depending on the application of the connecting element. In some embodiments, the thickness of the array is up to 1.2 mm. In other embodiments, the thickness is up to 0.5 mm. In some other embodiments, the thickness is up to 0.2 mm, in some other embodiments, the thickness is up to 0.1 mm. The thickness of the metal strip may be from 0.04 to 1.2 mm, or from 0.1 to 1.0 mm, or from 0.04 to 0.5 mm, or from 0.1 to 0.5 mm, or from 0.04 to 0.2 mm, or from 0.1 to 0.2 mm, or from 0.04 to 0.1 mm.

The thickness of the array typically is constant over the whole array, i.e. the thickness of the array is the same at each individual position of the array.

The support structure of the array disclosed herein may comprise at least one of an inner central element or an outer circumferential element.

If the support structure comprises an inner central element, such as a central ring-shaped element or a central polygon-shaped element, the individual connecting elements are placed around the inner central element, and each connecting element is associated with a holding arm integrally linking the connecting element to at least one of the inner central element and one or more other connecting elements. At least one of the individual connecting elements is associated with a holding arm integrally linking the connecting element to the inner central element. Typically, more than one of the individual connecting elements are associated with a holding arm integrally linking the connecting element to the inner central element.

For example, each connecting element placed around the inner central element may be associated with a holding arm integrally linking the connecting element to the inner central element. The individual connecting elements may be further associated with a further holding arm integrally linking the connecting element to another connecting element, and the individual connecting element may be even further associated with one more holding arm integrally linking the connecting element to a further connecting element. It is also possible that each individual connecting element is associated only with one holding arm integrally linking the connecting element only to the inner central element. Preferably, each individual connecting element is associated only with one holding arm integrally linking the connecting element only to the inner central element.

It is also possible that some of the individual connecting elements are associated with a holding arm integrally linking the connecting element to the inner central element and are associated with further holding arms integrally linking the connecting element to one or more other connecting elements, while some other of the individual connecting elements are associated with only one holding arm integrally linking the connecting element only to the inner central element, while some even other of the individual connecting elements are associated with one or more holding arm integrally linking the connecting element only to one or more other connecting elements and not to the inner central element.

In some embodiments, the inner central element may comprise a connecting element or may consist of a connecting element. In some embodiments, the inner central element may comprise or may consist of a plurality of connecting elements, each connecting element being associated with at least one holding arm integrally linking the connecting element to one or more other connecting elements of the inner central element.

If the support structure comprises an outer circumferential element such as an outer ring, the individual connecting elements are placed inside the outer circumferential element, for example inside the outer circumferential element around the inner circumference of the outer circumferential element, and each connecting element is associated with a holding arm integrally linking the connecting element to at least one of the outer circumferential element and one or more other connecting elements. At least one of the individual connecting elements is associated with a holding arm integrally linking the connecting element to the outer circumferential element. Typically, more than one of the individual connecting elements is associated with a holding arm integrally linking the connecting element to the outer circumferential element.

For example, each connecting element placed inside the outer circumferential element may be associated with a holding arm integrally linking the connecting element to the outer circumferential element. The individual connecting elements may be further associated with a further holding arm integrally linking the connecting element to another connecting element, and the individual connecting element may be even further associated with one more holding arm integrally linking the connecting element to a further connecting element. It is also possible that each individual connecting element is associated only with one holding arm integrally linking the connecting element only to the inner central element. Preferably, each individual connecting element is associated only with one holding arm integrally linking the connecting element only to the inner central element.

It is also possible that some of the individual connecting elements are associated with a holding arm integrally linking the connecting element to the outer circumferential element and are associated with further holding arms integrally linking the connecting element to one or more other connecting elements, while some other of the individual connecting elements are associated with only one holding arm integrally linking the connecting element only to the outer circumferential element, while some even other of the individual connecting elements are associated with one or more holding arm integrally linking the connecting element only to one or more other connecting elements and not to the outer circumferential element.

The support structure of the array disclosed herein may comprise an inner central element and an outer circumferential element. If the support structure comprises an inner central element and an outer circumferential element, each connecting element is associated with at least one holding arm integrally linking the connecting element to at least one of the following:
the inner central element,
the outer circumferential element, and
one or more other connecting elements.

If the support structure comprises an inner central element and an outer circumferential element, the individual connecting elements are placed around the inner central element and they are placed inside the outer circumferential element, for example inside the outer circumferential element around the inner circumference of the outer circumferential element, and each connecting element is associated with at least one holding arm integrally linking the connecting element to at least one of the inner central element, the outer circumferential element, and one or more other connecting elements. At least one of the individual connecting elements is associated with at least one holding arm integrally linking the connecting element to at least one of the inner central element and the outer circumferential element. Typically, more than one of the individual connecting elements are associated with at least one holding arm integrally linking the connecting element to at least one of the inner central element and the outer circumferential element.

For example, each connecting element placed around the inner central element and placed inside the outer circumferential element may be associated with a holding arm integrally linking the connecting element to the inner central element, and may also be associated with a further holding arm integrally linking the connecting element to the outer circumferential element. The individual connecting elements may be further associated with a further holding arm integrally linking the connecting element to another connecting element, and the individual connecting element may be even further associated with one more holding arm integrally linking the connecting element to a further connecting element. It is also possible that each individual connecting element is associated with a holding arm integrally linking the connecting element to the inner central element, is further associated with a further holding arm integrally linking the connecting element to the outer circumferential element, and is not further linked by a holding arm to one or more other connecting elements. Preferably, each individual connecting element is associated with a holding arm integrally linking the connecting element to the inner central element, is further associated with a further holding arm integrally linking the connecting element to the outer circumferential element, and is not further linked by a holding arm to one or more other connecting elements.

It is also possible that some of the individual connecting elements are associated with a holding arm integrally linking the connecting element to the inner central element and are further associated with one or more further holding arms integrally linking the connecting element to one or more other connecting elements, while some other of the individual connecting elements are associated with one holding arm integrally linking the connecting element only to the inner central element, while some other of the individual connecting elements are associated with a holding arm integrally linking the connecting element to the outer circumferential element and are further associated with one or more further holding arms to one or more other connecting elements, while some other of the individual connecting elements are associated with a holding arm integrally linking the connecting element only to the outer circumferential element, and while some even other of the individual connecting elements are associated with one or more holding arms integrally linking the connecting element only to one or more other connecting elements.

Each individual connecting element of the array disclosed herein may be a flat element. At least one or all of the individual connecting elements may also have extensions being directed out of the plane of the connecting element. These extensions may be used for pre-assembling the connecting element, i.e. for joining the connecting element to one of the two components to be frictionally joined by the connecting element. The extensions directed out of the plane of the connecting element are outside of the first and second joining surfaces of the connecting element, and they are shaped in such a way that they display an elastic or springy property which makes possible a reversible locking and thus a pre-assembly of the connecting element on one of the two components to be frictionally joined by the connecting element.

Further disclosed herein is also a process for producing an array of connecting elements as disclosed herein, the process comprising (a) forming an array from a piece of metal, wherein the array comprises
  (i) a support structure, and
  (ii) a plurality of metal substrates, each individual metal substrate being a metal substrate for a connecting element,
  wherein each metal substrate is associated with at least one holding arm integrally linking the metal substrate to at least one of
  (A) the support structure and
  (B) one or more other metal substrates;
  and wherein the array has a first surface on one side of the array and a second surface on an opposite side of the array, and
(b) fixing hard particles on the first and second surfaces of the array with a binder layer, to form the array of connecting elements.

The piece of metal used for forming the array typically is a metal sheet having a thickness of from to 1 mm. The metal sheet may be made from steel, for example from unalloyed steel. Also high-alloy steel or stainless steel can be used. Examples for unalloyed steel are grade C75S-1.1248 according to DIN EN 10132-4 or grade C60S-1.1211 according to DIN EN 10132-4.

From the piece of metal, an array is formed which comprises (i) a support structure, and (ii) a plurality of metal substrates. Each individual metal substrate is a metal substrate for a connecting element. The array may be formed by mechanical processes such as or punching or stamping or die cutting, or by laser cutting, or by waterjet cutting, or by electrical discharge machining (EDM).

The formed array has a first surface on one side of the array and a second surface on an opposite side of the array.

In the formed array, each metal substrate is associated with at least one holding arm integrally linking the metal substrate to at least one of (A) the support structure and (B) one or more other metal substrates.

At least one of the individual metal substrates is associated with at least one holding arm integrally linking the metal substrate to the support structure. This will ensure the integrity of the metal strip. Typically, more than one of the individual metal substrates are associated with at least one holding arm integrally linking the metal substrate to the support structure.

For example, each metal substrate may be associated with one holding arm integrally linking the metal substrate to the support structure. Each metal substrate may also be associated with more than one holding arm integrally linking the metal substrate to the support structure and to one or more other metal substrate. Each metal substrate may also be associated with one or more holding arms integrally linking the metal substrate to one or more other metal substrates.

It is also possible that some of the individual metal substrates are associated with a holding arm integrally linking the metal substrate to the support structure and are further associated with one or more further holding arms integrally linking the metal substrate to one or more other metal substrates, while some other of the individual metal substrates are associated with only one holding arm integrally linking the metal substrate only to the support structure, while some even other of the individual metal substrates are associated with one or more holding arms integrally linking the metal substrate only to one or more other metal substrates.

In some embodiments, the support structure may comprise a metal substrate or may consist of a metal substrate, with each individual metal substrate being a metal substrate for a connecting element. In some embodiments, the support structure may comprise or may consist of a plurality of metal substrates, each metal substrate being associated with at least one holding arm integrally linking the metal substrate to one or more other metal substrates of the support structure, and with each individual metal substrate being a metal substrate for a connecting element.

Each individual holding arm has a minimum width and a minimum cross-sectional area as described above in more detail.

After the array has been formed from the piece of metal, in a second process step, hard particles are fixed on the first and the second surface of the array with a binder layer. By fixing the hard particles on the first and second surfaces of the array with a binder layer, from each metal substrate a connecting element is formed. By fixing hard particles on the first and second surfaces of the array with a binder layer, the array of connecting elements is formed.

The hard particles and the binder layer are described above in more detail.

If the binder layer is a polymeric binder layer, the hard particles may be fixed on the first and second surfaces of the array with a polymeric binder layer by cathodic dip coating.

If the binder layer is a metallic binder layer, the hard particles may be fixed on the first and second surfaces of the array with a metallic binder layer by an electroless plating process, or by an electroplating process.

For example, the hard particles may be fixed on the first and second surfaces of the array with a metallic binder layer by an external current-fee (=chemical) electroplating process, also called electroplating process, preferably by an electroless nickel plating process, using a chemical nickel coating bath with dispersed hard particles. Such electroplating processes are customary in coating technology. The chemical nickel layer can be hardened by means of a heat treatment at up to about 400° C., with the result that the adhesion to the array substrate is improved and the inherent hardness of the metallic binder layer is increased.

For this coating process using a chemical nickel coating bath with dispersed hard particles, the arrays are placed on suitable carriers or racks to ensure a defined distance between different arrays and a uniform coating of the array, i.e. a uniform thickness of the metallic binder layer and a uniform distribution of the hard particles.

After fixing hard particles on the first and second surfaces of the array with a binder layer, the array typically has a thickness of from 0.04 to 1.2 mm.

The process disclosed herein for producing an array of connecting elements may further comprise
  (c) separating each connecting element from the support structure or from one or more other connecting elements, to form a plurality of individual connecting elements.

After the array of connecting elements has been obtained by fixing hard particles on the first and second surfaces of the array with a binder layer, the individual connecting elements can be separated from the support structure or from one or more other connecting elements.

The separation of an individual connecting element from the support structure or from one or more other connecting elements may be done at the holding arms to which the individual connecting element is associated with, or at the connecting element. For example, an individual connecting element may be separated from the support structure or from one or more other connecting elements at a position at the end of the holding arm to which the connecting element is integrally linked, i.e. at the transition zone from the holding arm to the connecting element. It is also possible to separate an individual connecting element from the support structure or from one or more other connecting elements at a position of the connecting element, for example at a position of up to 1 mm inwards from an outer contour of the connecting element.

Preferably, each connecting element is separated from the support structure or from one or more other connecting elements at the holding arms.

Typically, each connecting element is separated from the support structure or from one or more other connecting elements at the holding arms outside of the transition zones of the holding arms to the connecting element.

More preferably, each connecting element is separated from the support structure or from one or more other connecting elements at the holding arms at a position having a minimum width of the individual holding arm.

The separation of the individual connecting elements may be carried out manually by breaking off the individual connecting elements at the holding arms, or by an automated process such as punching or stamping, or by laser cutting, or by waterjet cutting, or by electrical discharge machining (EDM).

By separating each connecting element from the support structure or from one or more other connecting elements, a plurality of individual connecting elements is obtained.

After separation of the individual connecting elements from the support structure or from one or more other connecting elements, each individual connecting element of the plurality of connecting elements typically comprises a at least one portion of a holding arm which is extending from the connecting element. The at least one portion of a holding arm which is extending from the connecting element is extending in the plane of the connecting element. The at least one portion of a holding arm which is extending from the connecting element results from the production of the connecting element from the array of connecting elements, where the connecting element had been integrally linked to the support structure or to another connecting element by at least one holding arm, and from each one of these at least one holding arms a portion remains with the connecting element after separation.

Such a portion of a holding arm which is extending from the connecting element typically is relatively small compared to the size of the connecting element. Typically, the length of a portion of a holding arm which is extending from the connecting element after separation is between 0.2 and 30%, preferably between 0.2 and 10% of the diameter of the circumscribing circle of the connecting element.

If an individual connecting element is associated with only one holding arm integrally linking the connecting element to the support structure or to another connecting element, then after separation of the individual connecting element from the support structure or from the other connecting element, the individual connecting element comprises only one portion of a holding arm which is extending from the connecting element.

If an individual connecting element is associated with more than one holding arm integrally linking the connecting element to the support structure or to one or more other connecting elements, then after separation of the individual connecting element—from the support structure or from one or more other connecting elements, the individual connecting element comprises more than one portion of a holding arm which is extending from the connecting element. This means that from each of the holding arms to which the individual connecting element is associated with in the array, there will remain a portion of each of the holding arm with the connecting element after separation of the connecting element from the support structure or from one or more other connecting elements.

The one or more portions of a holding arm which are extending from the connecting element after separation of the connecting element from the support structure or from one or more other connecting elements are outside of the first and second joining surfaces of the connecting element.

After separation of the individual connecting elements from the support structure or from one or more other connecting elements, each individual connecting element of the plurality of connecting elements comprises at least one separation edge. The separation edge is located at the portion of the holding arm which is extending from the connecting element. The separation edge is a result of the separation of the individual connecting elements from the support structure or from one or more other connecting elements. The individual separated connecting element comprises a zone which is located at the separation edge with the metal substrate not comprising hard particles fixed on each joining surface of the metal substrate with a binder layer, i.e. this zone is not coated by hard particles fixed by a binder layer.

The zone which is located at the separation edge and which is not coated by hard particles fixed by a binder layer comprises the separation edge. The separation edge is perpendicular or largely perpendicular to the first and second joining surfaces of the connecting element. The zone which is located at the separation edge and which is not coated by hard particles fixed by a binder layer may further comprise portions of the first or second surfaces of the connecting element which are very close to the separation edge, as these portions of the coating may have peeled off by separating the connecting element from the support structure or from one or more other connecting elements. These portions of the zone at the separation edge which are not coated by hard particles fixed by a binder layer and which are on the first or second surfaces of the connecting element are relatively small compared to the total surface area of the first or second surface of the connecting element. Typically, the total surface area of the zone which is located at the separation edge and which is not coated by hard particles fixed by a binder layer amounts to at most 10%, or at most 5%, or at most 3%, or at most 2%, or at most 1% of the total surface area of the first or second surface of the connecting element. As the total surface area of the zone at the separation edge which is not coated by hard particles fixed by a binder layer is relatively small, it is ensured that the friction-enhancing function of the connecting element is not adversely affected.

The connecting element made from an array as disclosed herein may be used in a process for frictionally-coupling a first component and a second component with the connecting element, the process comprising
  providing a connecting element made from an array as disclosed herein,
  pressing the hard particles of the first joining surface of the connecting element into the component joining surface of the first component, and
  pressing the hard particles of the second joining surface of the connecting element into the component joining surface of a second component,
  thereby frictionally-coupling the first component and the second component with the connecting element.

Various embodiments of the connecting element according to the present disclosure are shown in the drawings.

FIGS. 1A-1C schematically show a first embodiment of an array 1 of the present disclosure and a connecting element 3 made from the array. FIG. 1A schematically shows the top view of the array 1 of connecting elements. FIG. 1B schematically shows a connecting element 3 made from the array 1. FIG. 1C shows a detail of FIG. 1A. The array 1 comprises a support structure 2 and three connecting elements 3. The support structure 2 has a triangular shape. Each connecting element 3 is associated with one holding arm 9 integrally linking the connecting element 3 to the support structure 2. Each connecting element 3 is a flat element. Also the support structure 2, the three holdings arms 9 and the array 1 are flat, with no extensions extending out of the plane of the array 1. The support structure 2 is an inner central element of the array 1. The support structure 2 may include a central hole 18. The central hole 18 reduces the surface area to be coated. It is also possible that the support structure has no central hole.

The array 1 has a first surface 10 on one side of the array 1 and a second surface 11 on an opposite side of the array. FIG. 1A also represents the top view of the first surface 10 of the array 1, which is the same as the top view of the second surface 11 of the array 1. The thickness of the array 1 is mm. The thickness of the array is measured perpendicular to the first and second surface 10, 11 of the array 1 and is not shown in the drawings. The thickness may also be from 0.04 to 1.2 mm. The minimum width 13 of each of the three holding arms 9 measured on the first or the second surface 10, 11 of the array 1 may be 0.5 mm (see FIGS. 1B, 1C). The length 12 of each of the three holding arms 9 measured on the first or the second surface 10, 11 of the array 1 may be 0.5 mm. (see FIGS. 1B, 1C). The diameter of the circumscribing circle 14 of the connecting element 3 may be 25 mm.

Figure 3:
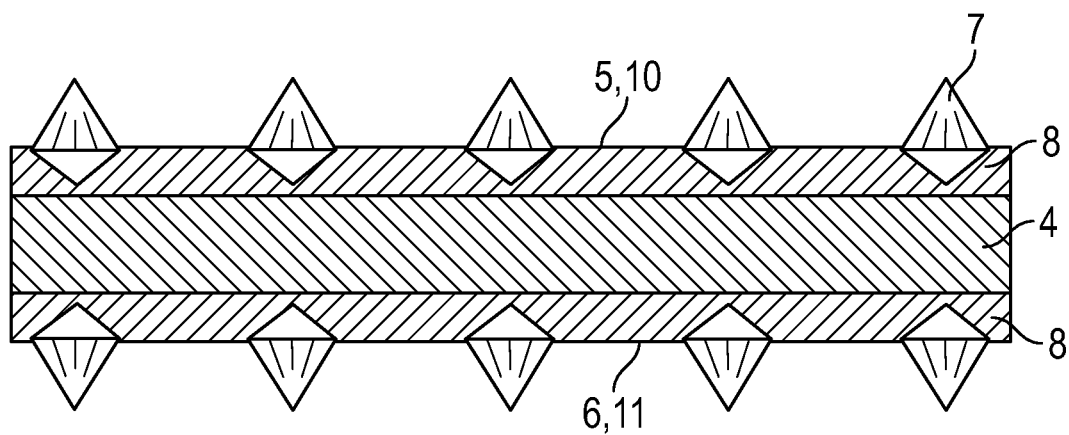

FIG. 3 schematically shows a cross-sectional view of the connecting element 3 of FIGS. 1A-1C. Each connecting element 3 comprises a metal substrate 4 having a first joining surface 5 on one side of the substrate and a second joining surface 6 on an opposite side of the substrate, wherein each joining surface 5, 6 comprises hard particles 7 fixed on the metal substrate 4 by a binder layer 8 which may be a metallic binder layer 8.

For producing the array of FIGS. 1A-1C, an array 1 as shown in FIG. 1A is formed from a metal sheet having a thickness of 0.1 mm, or from 0.01 to 1.0 mm, comprising the support structure 2 and three metal substrates 4, each individual metal substrate being a metal substrate for a connecting element 3. Each metal substrate 4 is associated with one holding arm 9 integrally linking the metal substrate 4 to the support structure 2. The array 1 has a first surface 10 on one side of the array and a second surface 11 on an opposite side of the array 1. After forming the array 1, hard particles 7 are fixed on the first and second surfaces 10, 11 of the array 1 with a metallic binder layer 8, to form the array 1 of connecting elements 3. The hard particles 7 may be diamond particles, for example, and may be fixed on the first and second surfaces 10, 11 of the array 1 with the metallic binder layer 8 by an electroless plating process. FIGS. 1A and 1C show the array 1 after the step of fixing hard particles 7 on the first and the second surface 10, 11 of the array 1 with a metallic binder layer 8, and FIGS. 1A and 1C also show the array before fixing hard particles on the first and the second surface of the array with a metallic binder layer 8, i.e. an array comprising the support structure 2, and a plurality of metal substrates 4, with each individual metal substrate 4 being a metal substrate for a connecting element 3.

In a further process step, the three connecting elements 3 are separated from the support structure 2 at the holding arms 9 at a position having a minimum width 13 of the individual holding arm 9, to form three individual connecting elements 3. The separation may be carried out manually by breaking off the individual connecting elements at the holding arms, or by an automated process such as punching or stamping, or by laser cutting, or by waterjet cutting, or by electrical discharge machining (EDM).

A top view of one of the three connecting elements 3 after separation from the support structure 2 is shown in FIG. 1B. The connecting element 3 comprises a portion of one of the holding arms 9 which is extending from the connecting element 3. The connecting element 3 comprises a separation edge 19. The separation edge 19 is located at the portion of the holding arm 9 which is extending from the connecting element 3. The separation edge 19 is a result of the separation of the connecting element 3 from the support structure 2. The separated connecting element 3 comprises a zone which is located at the separation edge 19 with the metal substrate 4 not comprising hard particles 7 fixed on each joining surface 5, 6 of the metal substrate 4 with a metallic binder layer 8, i.e. this zone is not coated by hard particles 7 fixed by a metallic binder layer 8. The zone which is located at the separation edge 19 and which is not coated by hard particles 7 fixed by a metallic binder 8 layer comprises the separation edge 19. The separation edge 19 is perpendicular or largely perpendicular to the first and second joining surfaces 5, 6 of the connecting element 3 (as FIG. 1B shows a top view of the connecting element 3, FIG. 1B also represents a top view of the first joining surface 5 of the connecting element 3, which is the same as the top view of the second joining surface 6 of the connecting element 3). The zone which is located at the separation edge 19 and which is not coated by hard particles fixed by a metallic binder layer may further comprise portions of the first or second surfaces 5, 6 of the connecting element, as these portions of the coating comprising the hard particles and the metallic binder layer may have peeled off by separating the connecting element 3 from the support structure 2. These portions of the zone at the separation edge which are not coated by hard particles fixed by a metallic-binder layer and which are on the first or second surfaces of the connecting element are not shown in FIG. 1B and are relatively small compared to the total surface area of the first or second surface of the connecting element. As the total surface area of the zone at the separation edge which is not coated by hard particles fixed by a metallic binder layer is relatively small, it is ensured that the friction-enhancing function of the connecting element is not adversely affected.

The connecting element 3 may also comprise holes 17, which serve to insert bolts or screw shafts for mechanically joining the connecting element 3 with two components to be frictionally joined. One of the two components is in contact with the first surface 5 of the connecting element 3, while the other one of the two components is in contact with the second surface 6 of the connecting element 3.

Figure 2B:
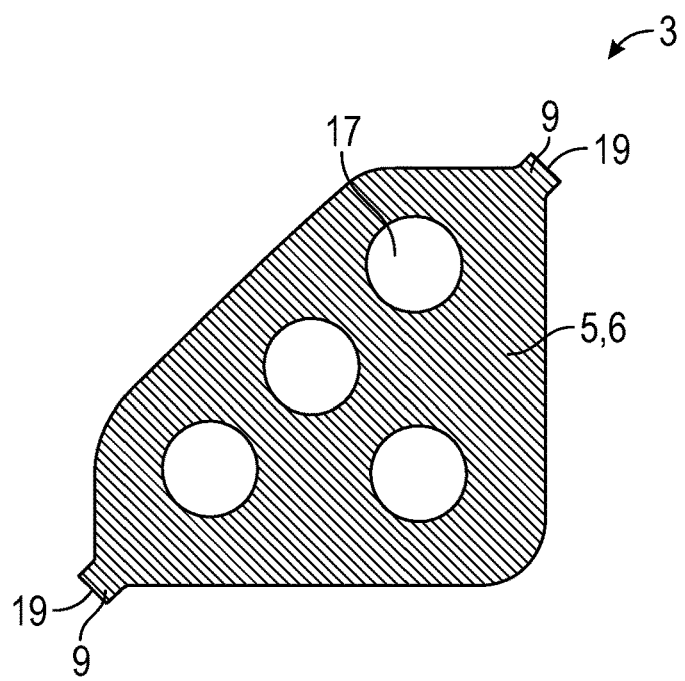
Figure 2C:
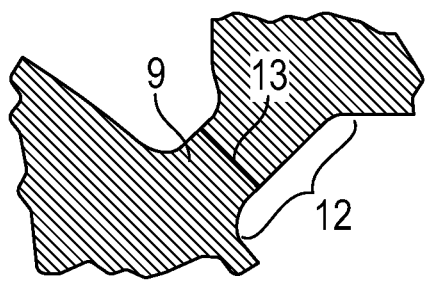
Figure 2D:
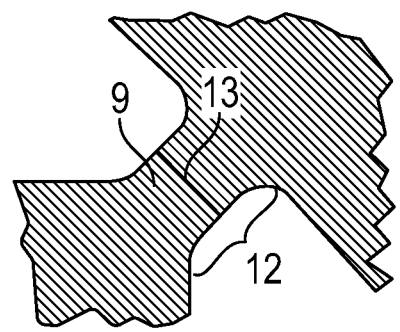

FIGS. 2A-2D schematically show a second embodiment of an array 1 of the present disclosure and a connecting element 3 made from the array. FIG. 2A schematically shows the top view of the array 1 of connecting elements. FIG. 2B schematically shows a connecting element 3 made from the array 1. FIGS. 2C and 2D each shows a detail of FIG. 2A. The array 1 comprises a support structure 2 and ten connecting elements 3. The support structure 2 comprises an inner central element 15 and an outer circumferential element 16. The inner central element 15 and the outer circumferential element 16 are annular shaped elements.

Each connecting element 3 is associated with one holding arm 9 integrally linking the connecting element to the inner central element 15 of the support structure 2. Each connecting element 3 is also associated with another holding arm 9 integrally linking the connecting element to the outer circumferential element 16 of the support structure 2. Each connecting element 3 is a flat element. Also the support structure 2, the three holdings arms 9 and the array 1 are flat, with no extensions extending out of the plane of the array 1. The inner central element 15 of the support structure 2 may include a central hole 18. The central hole 18 reduces the surface area to be coated. It is also possible that the support structure has no central hole.

The array 1 has a first surface 10 on one side of the array 1 and a second surface 11 on an opposite side of the array. FIG. 2A also represents the top view of the first surface 10 of the array 1, which is the same as the top view of the second surface 11 of the array 1. The thickness of the array 1 is mm. The thickness of the array is measured perpendicular to the first and second surface 10, 11 of the array 1 and is not shown in the drawings. The thickness may also be from 0.04 to 1.2 mm. The minimum width 13 of each of the holding arms 9 measured on the first or the second surface 10, 11 of the array 1 may be 0.6 mm (see FIGS. 2B, 2C, 2D). The length 12 of each of the holding arms 9 measured on the first or the second surface 10, 11 of the array 1 may be 0.8 mm (FIG. 2C) and 0.4 mm (FIG. 2D), respectively. The diameter of the circumscribing circle 14 of the connecting element 3 may be 35 mm.

The cross-sectional view of the connecting element 3 shown in FIG. 3 also represents a cross-sectional view of the connecting element 3 of FIGS. 2A-2D. Each connecting element 3 comprises a metal substrate 4 having a first joining surface 5 on one side of the substrate and a second joining surface 6 on an opposite side of the substrate, wherein each joining surface 5, 6 comprises hard particles 7 fixed on the metal substrate 4 by a binder layer 8, which may be a metallic binder layer 8.

For producing the array of FIGS. 2A-2D, an array 1 as shown in FIG. 2A is formed from a metal sheet having a thickness of 0.1 mm, or from 0.01 to 1.0 mm, comprising the support structure 2 and ten metal substrates 4, each individual metal substrate being a metal substrate for a connecting element 3. Each metal substrate 4 is associated with one holding arm 9 integrally linking the metal substrate 4 to the inner central element 15 of the support structure 2. Each metal substrate 4 is also associated with another holding arm 9 integrally linking the metal substrate 4 to the outer circumferential element 16 of the support structure 2. The array 1 has a first surface 10 on one side of the array and a second surface 11 on an opposite side of the array 1. After forming the array 1, hard particles 7 are fixed on the first and second surfaces 10, 11 of the array 1 with a metallic binder layer 8, to form the array 1 of connecting elements 3. The hard particles 7 may be diamond particles, for example, and may be fixed on the first and second surfaces 10, 11 of the array 1 with the metallic binder layer 8 by an electroless plating process. FIGS. 2A, 2C and 2D show the array 1 after the step of fixing hard particles 7 on the first and the second surface 10, 11 of the array 1 with a metallic binder layer 8, and FIGS. 2A, 2C and 2D also show the array before fixing hard particles on the first and the second surface of the array with a metallic binder layer 8, i.e. an array comprising the support structure 2, and a plurality of metal substrates 4, with each individual metal substrate 4 being a metal substrate for a connecting element 3.

In a further process step, the ten connecting elements 3 are separated from the inner central element 15 and the outer circumferential element 16 of the support structure 2 at the holding arms 9 at a position having a minimum width 13 of the individual holding arm 9, to form ten individual connecting elements 3. The separation may be carried out manually by breaking off the individual connecting elements at the holding arms, or by an automated process such as punching or stamping, or by laser cutting, or by waterjet cutting, or by electrical discharge machining (EDM).

A top view of one of the ten connecting elements 3 after separation from the array 1 is shown in FIG. 2B. The connecting element 3 comprises a portion of each of the two holding arms 9 which are extending from the connecting element 3. The connecting element 3 comprises two separation edges 19. The separation edges 19 are located at the portion of the holding arms 9 which is extending from the connecting element 3. The separation edges 19 are a result of the separation of the connecting element 3 from the inner central element 15 and the outer circumferential element 16 of the support structure 2. The separated connecting element 3 comprises two zones which are located at each of the two separation edges 19, with the metal substrate 4 not comprising hard particles 7 fixed on each joining surface 5, 6 of the metal substrate 4 with a metallic binder layer 8, i.e. this two zones are not coated by hard particles 7 fixed by a metallic binder layer 8. Each of the two zones which are located at the separation edges 19 and which are not coated by hard particles 7 fixed by a metallic binder 8 layer comprises the separation edge 19. The separation edge 19 is perpendicular or largely perpendicular to the first and second joining surfaces 5, 6 of the connecting element 3 (as FIG. 2B shows a top view of the connecting element 3, FIG. 2B also represents a top view of the first joining surface 5 of the connecting element 3, which is the same as the top view of the second joining surface 6 of the connecting element 3). The zone which is located at the separation edge 19 and which is not coated by hard particles fixed by a metallic binder layer may further comprise portions of the first or second surfaces 5, 6 of the connecting element, as these portions of the coating comprising the hard particles and the metallic binder layer may have peeled off by separating the connecting element 3 from the support structure 2. These portions of the zone at the separation edge which are not coated by hard particles fixed by a metallic binder layer and which are on the first or second surfaces of the connecting element are not shown in FIG. 2B and are relatively small compared to the total surface area of the first or second surface of the connecting element. As the total surface area of the zone at the separation edge which is not coated by hard particles fixed by a metallic binder layer is relatively small, it is ensured that the friction-enhancing function of the connecting element is not adversely affected.

The connecting element 3 may also comprise holes 17, which serve to insert bolts or screw shafts for mechanically joining the connecting element 3 with two components to be frictionally joined. One of the two components is in contact with the first surface 5 of the connecting element 3, while the other one of the two components is in contact with the second surface 6 of the connecting element 3.

The connecting element made from an array as disclosed herein can be used to connect a first component and a second component to be joined in machine, plant or motor vehicle construction, in energy generation, or in microelectronic or micromechanic equipment. The connecting element made from an array as disclosed herein can be used for friction-increasing connection of a first component and a second component to be joined in machine, plant or motor vehicle construction, in energy generation, or in microelectronic or micromechanic equipment. The connecting element made from an array as disclosed herein can be used for friction-increasing, play-free and/or reversible connection of a first and a second component to be joined in machine, plant or motor vehicle construction, in energy generation, or in microelectronic or micromechanic equipment.

In principle, the connecting element disclosed herein can be used in any type of frictional connection throughout the field of mechanical engineering.

For example, the connecting element disclosed herein can be used for frictional connections, such as bolted or clamped connections, between parts or components of vehicles, or in microelectronic or micromechanic equipment.

The invention claimed is:

1. An array of connecting elements, the array comprising
   (i) a support structure, and
   (ii) a plurality of connecting elements, wherein each connecting element comprises a metal substrate having a first joining surface on one side of the substrate and a second joining surface on an opposite side of the substrate, wherein each joining surface comprises hard particles fixed on the metal substrate by a binder layer;
   wherein each connecting element is associated with at least one holding arm integrally linking the connecting element to at least one of
      (a) the support structure and
      (b) one or more other connecting elements.

2. The array of claim 1, wherein the array has a first surface on one side of the array and a second surface on an opposite side of the array, and wherein each individual holding arm has a cross section that is perpendicular to the first and the second surface of the array, and wherein a minimum cross-sectional area of each individual holding arm is between 0.005 and 10 mm².

3. The array of claim 1, wherein the array has a first surface on one side of the array and a second surface on an opposite side of the array, and wherein a minimum width of each individual holding arm measured on the first or the second surface of the array is between 0.1 and 10 mm.

4. The array of claim 1, wherein the thickness of the array is from 0.04 to 1.2 mm.

5. The array of claim 1, wherein the support structure comprises at least one of an inner central element or an outer circumferential element.

6. The array of claim 1, wherein the support structure comprises an inner central element and an outer circumferential element, and wherein each connecting element is associated with at least one of the holding arms integrally linking the connecting element to at least one of the following:
   the inner central element,
   the outer circumferential element, and
   one or more other connecting elements.

7. The array of claim 1, wherein each connecting element is a flat element.

8. The array of claim 1, wherein the hard particles are selected from the group consisting of silicon carbide, aluminum oxide, boron carbide, cubic boron nitride, and diamond.

9. A process for producing an array of connecting elements according to claim 1, the process comprising
   (a) forming an array from a piece of metal, wherein the array comprises
      (i) a support structure, and
      (ii) a plurality of metal substrates, each individual metal substrate being a metal substrate for a connecting element,
      wherein each metal substrate is associated with at least one holding arm integrally linking the metal substrate to at least one of
         (A) the support structure and
         (B) one or more other metal substrates;
      and wherein the array has a first surface on one side of the array and a second surface on an opposite side of the array, and
   (b) fixing hard particles on the first and second surfaces of the array with a binder layer, to form the array of connecting elements.

10. The process of claim 9, further comprising
    (c) separating each connecting element from the support structure or from one or more other connecting elements, to form a plurality of individual connecting elements.

11. The process of claim 10, wherein each connecting element is separated from the support structure or from one or more other connecting elements at the holding arms, preferably at a position having a minimum width of the individual holding arm.

12. The process of claim 11, wherein each individual connecting element of the plurality of connecting elements comprises at least one portion of a holding arm which is extending from the individual connecting element.

13. The process of claim 12, wherein each individual connecting element of the plurality of connecting elements comprises at least one separation edge, wherein the separation edge is located at the portion of the holding arm which is extending from the individual connecting element, and wherein the individual connecting element comprises a zone which is located at the separation edge with the metal substrate not comprising hard particles fixed on each joining surface of the metal substrate with a binder layer.

14. The process of claim 9, wherein the hard particles are fixed on the first and second surfaces of the array with a metallic binder layer by an electroless plating process, or by an electroplating process.

\* \* \* \* \*